Oct. 17, 1944.  E. G. SIMPSON  2,360,524
LATCH FOR CONVERTIBLE AUTOMOBILE TOP
Filed Sept. 26, 1941  3 Sheets-Sheet 1
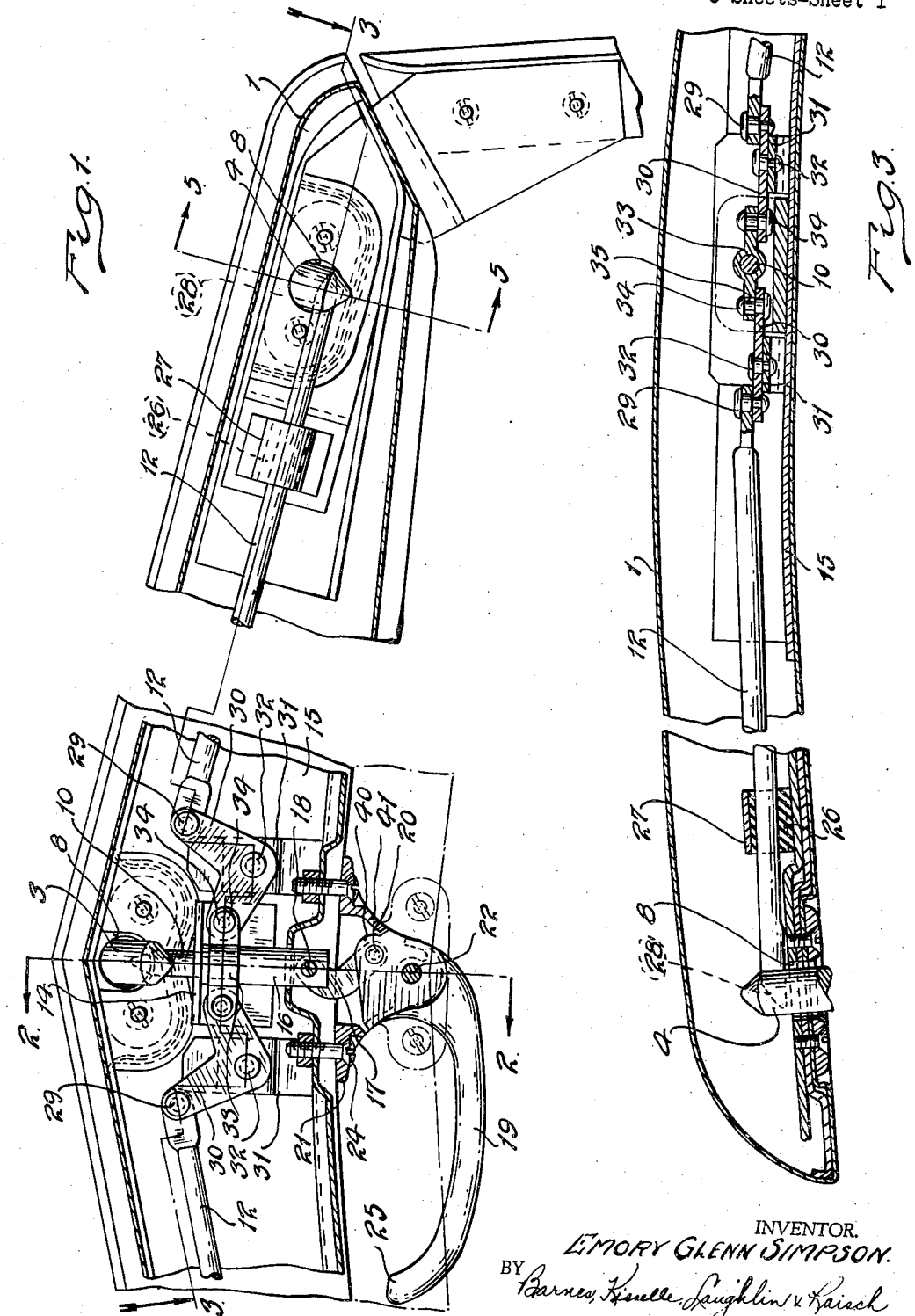
INVENTOR.
EMORY GLENN SIMPSON.
BY Barnes, Kisselle, Laughlin & Raisch
ATTORNEYS.

Oct. 17, 1944.   E. G. SIMPSON   2,360,524
LATCH FOR CONVERTIBLE AUTOMOBILE TOP
Filed Sept. 26, 1941   3 Sheets-Sheet 2
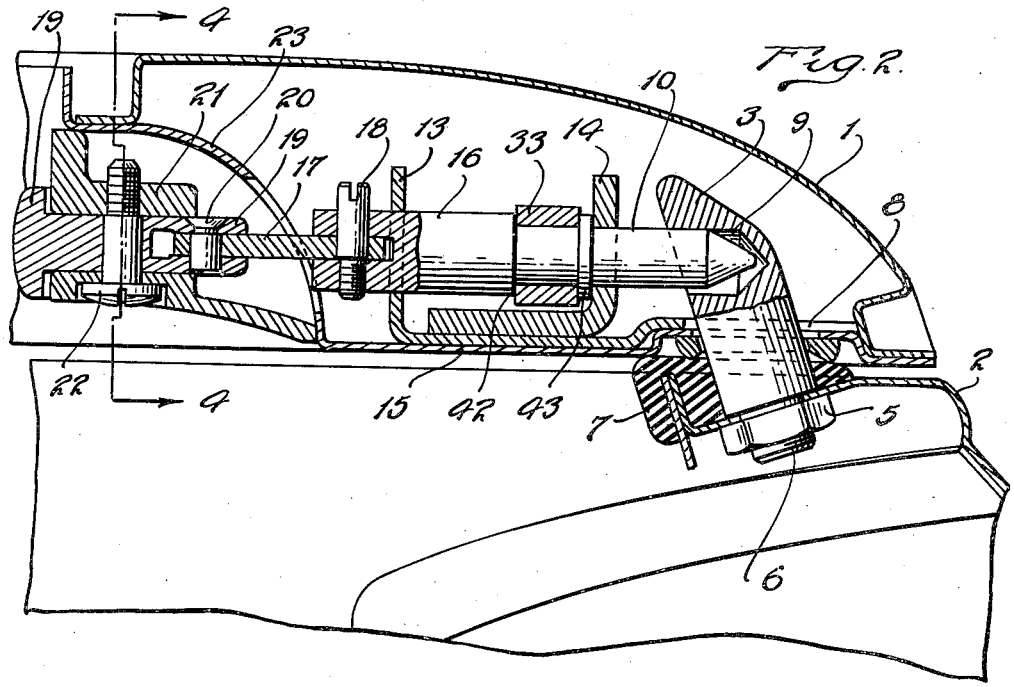
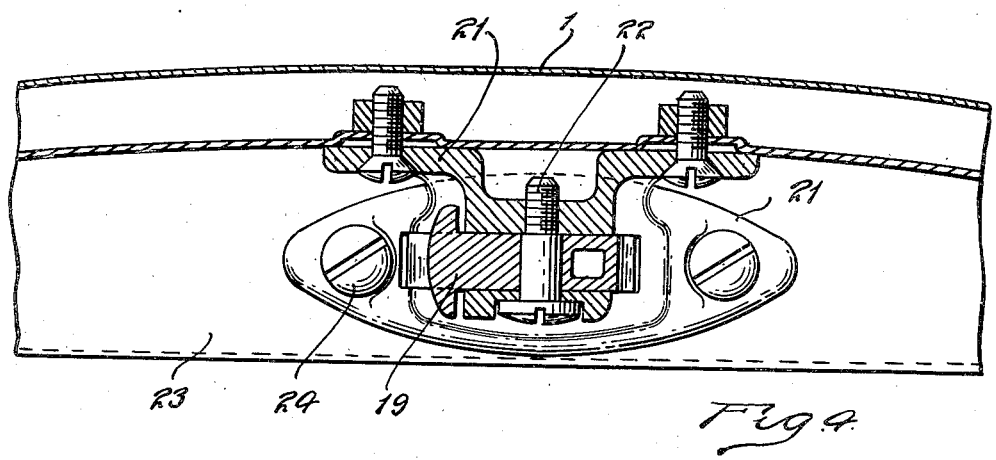
INVENTOR.
EMORY GLENN SIMPSON
BY
Barnes, Kisselle, Laughlin & Raisch
ATTORNEYS.

Oct. 17, 1944.  E. G. SIMPSON  2,360,524
LATCH FOR CONVERTIBLE AUTOMOBILE TOP
Filed Sept. 26, 1941  3 Sheets-Sheet 3
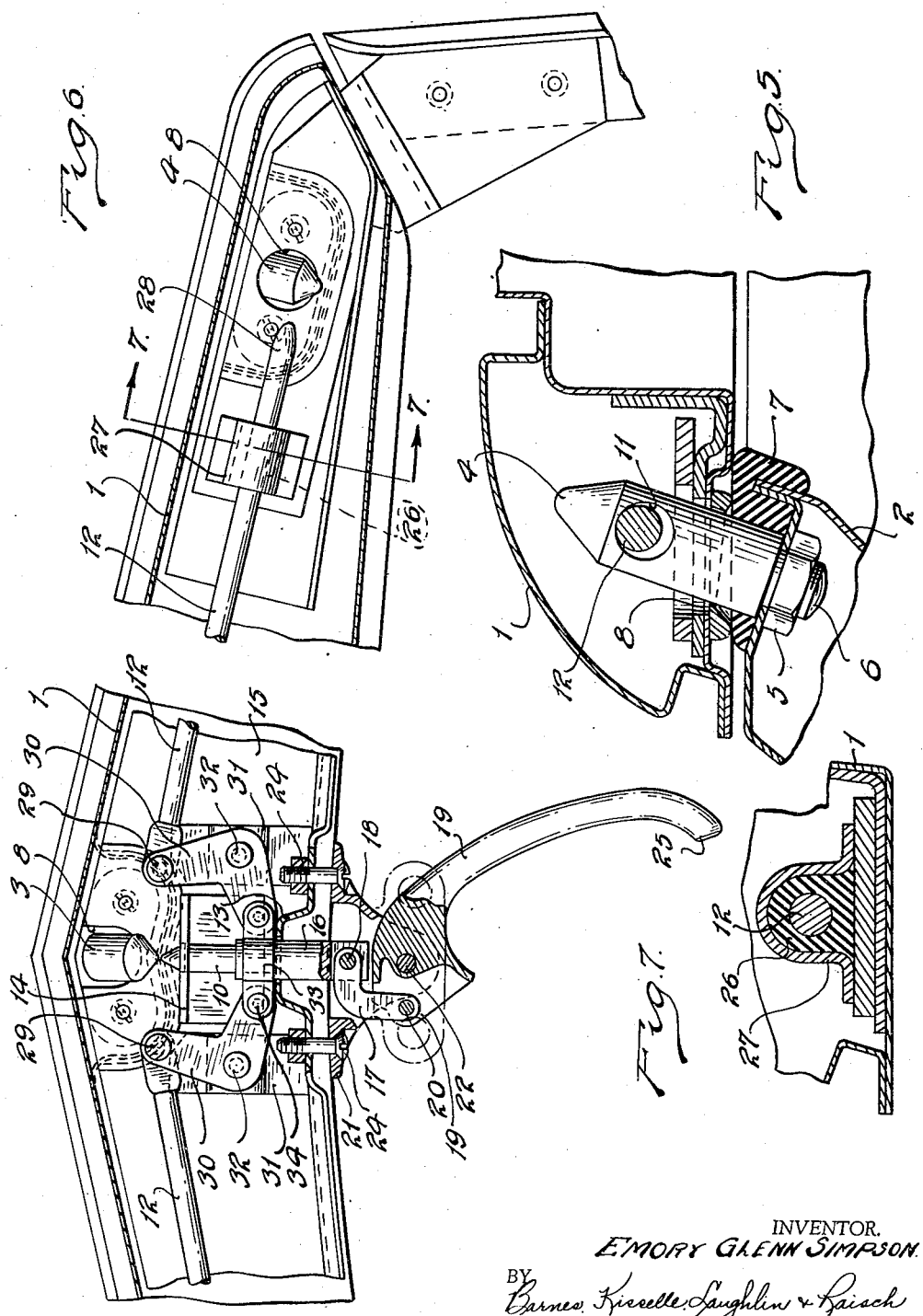
INVENTOR.
EMORY GLENN SIMPSON.
BY Barnes, Kisselle, Laughlin & Raisch
ATTORNEYS.

Patented Oct. 17, 1944

2,360,524

UNITED STATES PATENT OFFICE 2,360,524

LATCH FOR CONVERTIBLE AUTOMOBILE TOPS

Emory Glenn Simpson, Detroit, Mich., assignor to Ternstedt Manufacturing Company, Detroit, Mich., a corporation of Michigan Application September 26, 1941, Serial No. 412,367

2 Claims. (Cl. 296—120)

This invention relates to a latch and more particularly to a center control latch for the front roof rail of a convertible automobile top.

It is an object of this invention to produce a latch for a convertible top which is easily manipulated from the center of the front roof rail and which effectively latches the front roof rail to the windshield header so that the connection between the front roof rail and header is free from rattles.

Another object of the invention is to produce a latch which will not release due to the vibration incidental to the operation of a vehicle and which cannot be released by manipulation of the latch bolt. This object is achieved by including in the bolt operating mechanism a toggle link which is thrown over center when the latch bolts are projected and in latching position.

In the drawings:

Fig. 1 is a horizontal section through the top front roof rail looking down on the rail showing the parts in latched position.

Fig. 2 is a vertical section longitudinally of the body along the line 2—2 of Fig. 1.

Fig. 3 is a transverse section along the line 3—3 of Fig. 1.

Fig. 4 is a section along the line 4—4 of Fig. 2.

Fig. 5 is a section along the line 5—5 of Fig. 1.

Fig. 6 is a sectional view similar to Fig. 1 but showing the parts in unlatched position.

Fig. 7 is a section along the line 7—7 of Fig. 6.

This invention relates to a latch for latching the front roof rail of an automobile convertible top to the windshield header bar. The front roof rail of the convertible top is designated 1 and the windshield header bar is designated 2.

The windshield header bar is provided with three identical keepers for interengaging the latch bolts. One of these keepers 3 is positioned at the center of the windshield header and the other two keepers 4 are positioned one at each end of the header. The keepers can be secured to the header in any suitable manner such as by means of nuts 5 which screw on to the threaded reduced ends 6 of the keepers. The weatherstrip 7 is positioned along the upper face of the header 2 for sealing the joint between the header and the top front rail 1. The rail 1 is provided with openings 8 through which the keepers 4 project when the convertible top is raised and the rail 1 seated on the header 2. The keeper 3 is provided with a recess 9 in which the center latch bolt 10 interengages the keeper 3. Keepers 4 are each provided with a recess 11 in which the laterally extending or auxiliary bolts 12 interengage the keepers 4.

As shown in Fig. 2, the center bolt 10 is slidably supported for reciprocation in brackets 13 and 14 which are secured to the bottom wall 15 of the front roof rail 1. The tail 16 of the bolt 10 is pivotally connected with link 17 by means of pin 18. Link 17 is pivotally connected with the pivoted hand lever 19 by pin 20. Hand lever 19 is pivotally supported in bracket 21 by pin 22. Bracket 21 is secured to the rear side wall 23 of the roof rail 1 by bolts 24. Handle 19, as shown in Figs. 2 and 4, swings in a horizontal plane about a vertical axis in the form of pin 22. Thus, when in latched position, as shown in Fig. 1, the flat side face rather than the end 25 of the handle 19 is presented toward the occupants of the vehicle which obviates any hazard in case during an accident one of the occupants should be thrown against the handle 19.

Each of the auxiliary or lateral bolts 12 is slidably supported adjacent its head 28 in a rubber cushion block 26 which is secured to the base of the roof rail by bracket 27. The tail of each of the bolts 12 is pivotally connected by means of pin 29 to a bell crank lever 30. The bell crank levers are pivotally supported on brackets 31 by pins 32 so that the bell cranks 30 swing about a vertical axis. Brackets 31 are secured to the bottom wall 15 of the front roof rail 1. The bell cranks 30 are each pivotally connected to opposite ends of a yoke 33 by means of a lost motion connection in the form of a pin 34 carried by the bell crank which interengages the yoke in an opening 35 having a greater diameter than the pin 34. This lost motion connection is necessary because pin 34 swings about pin 32 as a center whereas yoke 33 travels in a straight line with bolt 10.

The position of the parts of the lock when latched is shown in Fig. 1. At this time it will be noted that pin 20 is off center or to the right of a line passing through pins 22 and 18. Thus, any tendency of the bolts 10 and 12 to move toward unlocked position, other than when retracted by handle 19, is effectively resisted by the over center position of link 17. If vibration of the car should tend to move the bolts 10 and 12 to unlocked position, or if an attempt is made to manually move the bolts 10 and 12 to unlocked position, the motion would be transmitted through bell cranks 30, the tail 16 of the bolt and link 17 to handle 19, thus tending to turn handle 19 still further in a bolt projecting direction, that is, clockwise as viewed in Fig. 1. However, handle 19 cannot move further clockwise because the end 25 is in abutting relation with the inner side wall 23 of the rail 1 and shoulder 40 on the handle will abut stop 41 on bracket 21 long before the bolt heads can be withdrawn from their keepers 3 and 4. It should be noted that a single over center link 17 serves to effect the above over center locking of all the bolts 12 and 10.

To retract the bolts, handle 19 is swung from the position shown in Fig. 1 to that shown in Fig. 6. The pull on handle 19 is transmitted through link 17 to bolt 10 and thereby retracts bolt 10 with a straight line motion. Yoke 33 being mounted between shoulders 42 and 43 on bolt 10 necessarily travels with the bolt 10. As the bolt 10 is retracted, yoke 33 causes bell cranks 30 to swing about their supports 32 and thus retract each of the bolts 12 transversely of the vehicle body and transversely of the direction in which bolt 10 is retracted. In other words, as bolts 12 are retracted they move axially toward each other and toward bolt 10 to the position shown in Fig. 6.

I claim:

1. In an automotive vehicle body having a windshield header and a convertible top with a front top rail, a latch adapted for latching the front top rail to the windshield header comprising a keeper positioned centrally of the windshield header and a pair of keepers positioned on the windshield header and laterally offset from, and one keeper on each side of, the centrally positioned keeper, a bolt shiftable lengthwise of the vehicle body for interengagement with the centrally positioned keeper, and a pair of bolts positioned on opposite sides of the first mentioned bolt and shiftable laterally of the vehicle body for interengagement with the laterally offset keepers, means interconnecting the laterally shiftable bolts with the first mentioned bolt whereby latching and unlatching movement of the first mentioned bolt effects corresponding movement of the two laterally shiftable bolts, a handle lever pivotally mounted on the top rail and a link pivotally connected to the handle lever and to the first mentioned bolt whereby the handle lever can be swung to shift the first mentioned bolt and simultaneously shift the laterally shiftable bolts, said link and handle lever forming a toggle which is thrown to over center position for positively locking all the bolts in projected position.

2. In an automotive vehicle body having a windshield header and a convertible top with a hollow front top rail, a latch adapted for latching the front top rail to the windshield header comprising a keeper positioned centrally of the windshield header, and a pair of keepers positioned on the windshield header and laterally offset from, and one keeper on each side of, the centrally positioned keeper, a bolt mounted within the hollow front rail and slidable lengthwise of the vehicle body for interengagement with the centrally positioned keeper, a pair of bolts mounted within the top rail and positioned on opposite sides of the first mentioned bolt and slidable laterally of the vehicle body for interengagement with the laterally offset keepers, the said top rail having openings therein through which the keepers project for interengagement with the latch bolts, means interconnecting the laterally slidable bolts with the first mentioned bolt whereby latching and unlatching movement of the first mentioned bolt effects corresponding movement of the two laterally slidable bolts, a handle lever pivotally mounted on the top rail and a link pivotally connected to the handle lever and to the first mentioned bolt whereby the handle lever can be swung to shift the first mentioned bolt and simultaneously shift the laterally shiftable bolt, said link and handle lever forming a toggle which is thrown to over center position for positively locking all the bolts in projected position.

EMORY GLENN SIMPSON.